United States Patent [19]
Pfeiffer

[11] 3,825,828
[45] July 23, 1974

[54] DEVICE FOR TESTING SEMICONDUCTORS AND OTHER ELECTRICAL COMPONENTS

[76] Inventor: John C. Pfeiffer, 560 Garden Dr., Louisville, Ky. 40206

[22] Filed: Dec. 21, 1972

[21] Appl. No.: 317,409

[52] U.S. Cl............................................. 324/158 T
[51] Int. Cl............................................. C01r 31/22
[58] Field of Search...................... 324/158 T, 158 D

[56] References Cited
UNITED STATES PATENTS
2,894,206    7/1959    Montgomery................... 324/158 T

OTHER PUBLICATIONS

Sands, L.G., Dynamic Testers...; Electronics, Feb. 19, 1960, pgs. 66, 67.
Montgomery, G. F., Transistor Beta Tester; Electronics, May 1, 1957, pg. 198.
Dynamic Transistor Checker; Electronics World, Oct. 1959, pg. 102.

*Primary Examiner*—Alfred E. Smith
*Assistant Examiner*—Ernest F. Karlsen
*Attorney, Agent, or Firm*—Maurice L. Miller, Jr.

[57] ABSTRACT

A device for testing the dynamic operation of semiconductor and other electrical components which may exhibit amplifier characteristics, having circuitry adapted to form an electronic oscillator in association with such a component, an amplifier stage coupled to the circuitry, and an indicator lamp connected to the amplifier stage to detect the presence of oscillations in the circuitry. An additional feature includes a second indicator lamp connected to the circuitry to detect current flow through various electrodes of the component under test to indicate its d.c. electrical continuity. The polarity of a d.c. potential applicable to the component being tested is reversible to permit testing of the dynamic properties of both PNP and NPN type semiconductors as well as for testing the rectifier properties of transistor junctions, diodes, thyristors and other electrical components. The device also features means for testing its own operation including a transistor which may be switched into the circuitry of the oscillator stage in place of the component to be tested. Collector feedback bias is utilized in the operation of the oscillator stage to minimize thermal instability thereof and to permit operation of the stage at radio frequencies.

11 Claims, 2 Drawing Figures

DEVICE FOR TESTING SEMICONDUCTORS AND OTHER ELECTRICAL COMPONENTS

BACKGROUND OF THE INVENTION

This invention relates to the field of transistor and semiconductor testers as well as to devices for testing the continuity and rectifier characteristics of electrical components.

Devices for testing the dynamic properties of bipolar transistors by forming an electronic oscillator stage in association therewith and indicating the presence of oscillation in said stage are well known in the prior art. Such devices are particularly useful because they can often be used to test a transistor without the necessity for disconnecting the transistor from the circuit in which it is normally employed. They are not ordinarily prone to falsely indicate that a transistor is operative, at least at audio frequencies at which the test is conducted, because the transistor under test must be capable of both generating an electronic signal and amplifying the same sufficiently to overcome circuit losses and thereby produce sustained oscillation in the test oscillator stage.

By contrast, testers which operate the transistor merely as an amplifier must supply a signal thereto from an external source. The signal can sometimes become coupled from the tester's transistor input circuit to the output circuit by means external to the transistor, especially where the transistor under test is connected to other circuitry during the test. In such cases, the amplifier type of transistor tester may indicate that the transistor is functioning as an amplifier, when it is actually defective and incapable of doing so.

A principal difficulty encountered with the prior art oscillator type testers is that they operate the transistor under test at audio frequencies whereas, in many cases, such as in television and computer applications, the transistor being tested is normally operated at a much higher radio frequency. For a variety of reasons, sometimes due to aging and circuit conditions, the interelectrode capacitance of the transistor may gradually increase to such a degree that the gain of the transistor will be markedly reduced at radio frequencies while its gain at the audio test frequencies will remain high and relatively unchanged. Under such circumstances, the transistor may appear to be operative when tested with the prior art testers when, in fact, it is inoperative in its normal radio frequency application.

Another difficulty frequently encountered with these prior art testers is that they often cannot produce oscillations of sufficient magnitude to actuate detecting means such as lamps and speakers without operating the transistor under test near or beyond its heat dissipation rating, except where the larger power type transistors are being tested.

Still another difficulty with these prior art testers is that they do not incorporate means for testing their own internal circuitry. As a consequence, a great deal of time and effort can be wasted in checking elements of electronic circuitry which the user suspects as being defective without having any reason to know that the tester he is using is also defective. In testing complex electrical circuits, it is quite easy to become mislead because of an unsuspected tester malfunction and often quite difficult to retrace the ground covered during the test once the tester malfunction has been discovered and corrected.

My invention substantially overcomes these and other diffuculties known in the prior art.

SUMMARY OF THE INVENTION

It is an object of the instant invention to provide a device for testing the dynamic properties of transistors at radio frequencies where frequency dependent defects can be more readily detected.

It is a further object of the instant invention to provide an oscillator type transistor tester featuring means for testing its own operation.

It is yet another object of the instant invention to provide a device for testing a semiconductor which operates the semiconductor at a releatively low level of heat dissipation.

It is still another object of the instant invention to provide a device for testing the continuity and rectifier characteristics of electrical components.

It is also an object of the instant invention to provide a device for testing transistors of both the bipolar and junction field effect type.

In accordance with the instant invention, there is provided a device for testing a semiconductor of the type which may exhibit amplifier characteristics having circuit means adapted for operative association with the semiconductor to produce feedback induced oscillations. Amplifying means is coupled to the circuit means which is responsive to such oscillations. Detecting means is responsively connected to the amplifying means for indicating the presence of oscillations in the circuit means.

These and other objects of the instant invention will become apparent to those skilled in the art from the following detailed description and attached drawing on which, by way of example, only the preferred embodiments of the instant invention are illustrated.

DESCRIPTION OF THE PREFERRED EMBODIMENTS

Figure 1:
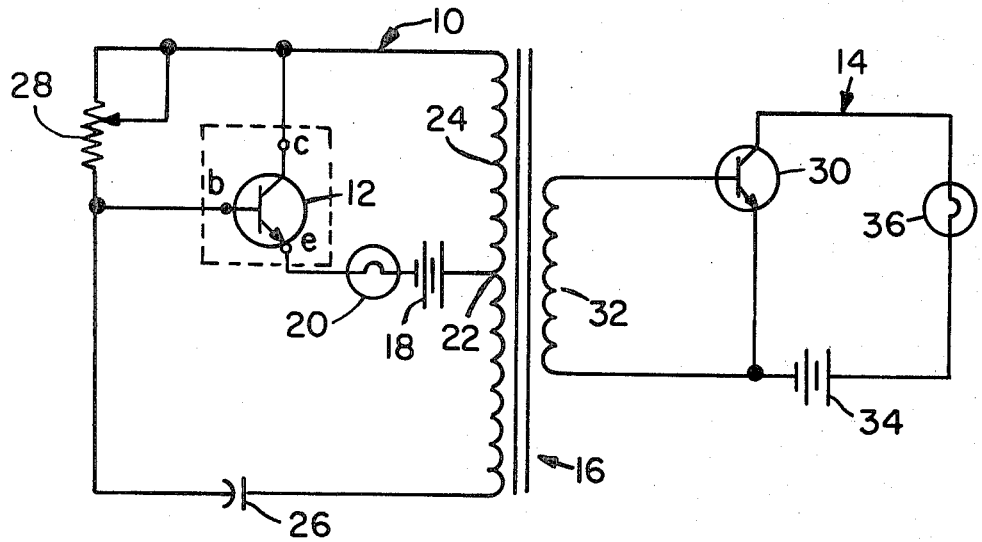
FIG. 1 is a schematic diagram of a device for testing semiconductors and other electrical components illustrating one preferred embodiment of the instant invention.

Referring to FIG. 1 there is shown, in one embodiment of the instant invention, a device suitable for testing various electrical properties of semiconductors and other electrical components, such as amplifier and rectifier properties and electrical continuity, having a circuit means 10 adapted to form a Hartley type test oscillator stage in association with a transistor 12 under test. An amplifier stage 14 is coupled to the circuit means 10, preferably by means of a suitable interstage transformer 16.

The circuit means 10 is provided with suitable, and preferably insulated, leads adapted for connection to the base $b$, collector $c$ and emitter $e$ of the transistor 12. The ends of such leads may contain conventional alligator clips, hand-held probes or other suitable and well-known connecting means, not shown, to facilitate connecting the tester to the transistor 12, particularly where the latter remains connected to external circuitry, now shown, during testing. Hereafter, unless the context otherwise indicates, the particular leads being referred to will be designated as those which connect to the familiar electrodes of the transistor 12 although other devices having different electrodes such as a cathode, anode, and gate, for example, may be tested by the device of the instant invention.

A source 18 of d.c. potential to power the transistor 12 is connected in series with an indicator lamp 20, which combination is connected between a tap 22 on a primary coil 24 of the transformer 16 and the emitter lead $e$. The coil 24 is connected between the collector lead $c$ and, through a d.c. blocking capacitor 26, to the base lead $b$. The portion of the coil 24 connected between the tap 22 and the collector lead $c$ forms a resonant or tuned tank circuit for the oscillator stage due to the natural inductance and distributed capacitance thereof. Assuming that the transistor 12 is operative, a portion of any a.c. signal developed across the coil 24 will be fed back across the input electrodes of the transistor 12 through the base lead $b$ and emitter lead $e$ to produce feedback induced oscillations in the circuit means 10. A variable resistor 28 is connected between the collector lead $c$ and the base lead $b$ to provide d.c. base current bias for the transistor 12 under test. Though the resistor 28 may be fixed in value, it is preferable to provide variable resistance so that a convenient operating point can be provided for the testing of a wide variety of transistors and other components.

The amplifier stage 14 consists of a transistor 30 of any suitable type having its base and emitter connected to a secondary coil 32 of the transformer 16 and having its collector and emitter connected to the series combination of a second source 34 of d.c. potential and an indicator lamp 36. The indicator lamp 36 functions as detecting means for indicating the presence of electronic oscillations in the circuit means 10.

If the transistor 12 is capable of dynamic operation as an amplifying device, the circuit means 10 will circulate feedback induced a.c. oscillations. This will produce current flow through the resonant circuit formed by the portion of the coil 24 as previously explained and, when of sufficient magnitude, will cause the lamp 20 to glow. A portion of the a.c. signal developed across the coil 24 will be coupled into the amplifier stage 14 which will cause the lamp 36 to glow, indicative of sustained oscillation in the circuit means 10 as well as dynamic operation of the transistor 12.

If, on the otherhand, after adjusting the resistor 28 through its range in order to place the transistor 12 at a proper d.c. operating point, the lamp 36 cannot be made to glow, such a condition will indicate that the transistor 12 is not capable of dynamic operation and is therefore defective. One possible cause for such a defect is a short-circuit condition in the collector-emitter junction of the transistor 12, in which event the lamp 20 will glow while the lamp 36 will not. Another possible cause for the defect is an open-circuit condition of the collector-emitter junction of the transistor 12, in which event neither of the lamps 20 and 36 will glow.

Figure 2:
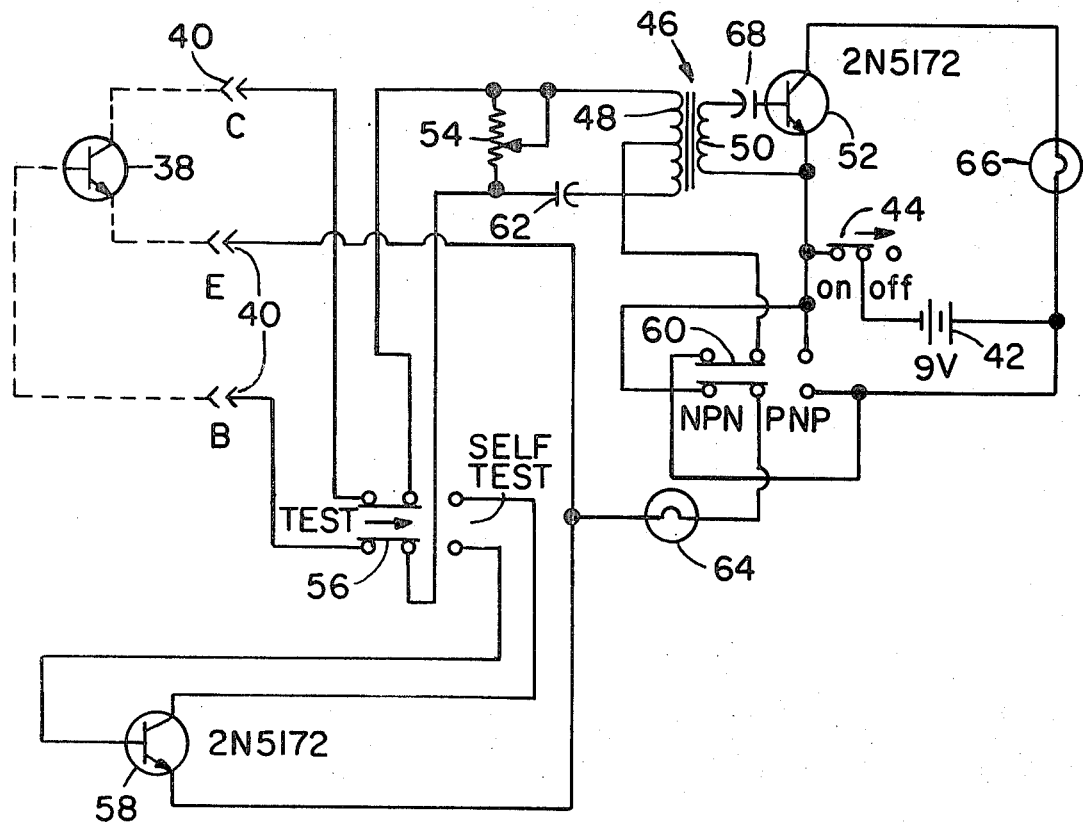
FIG. 2 is a schematic diagram of a device for testing semicondctors and other electrical components illustrating another preferred embodiment of the instant invention.

Referring now to FIG. 2 there is shown a specific example of a tester provided in accordance with my invention, which I have found to be highly suitable for the testing of a wide variety of bipolar and junction field effect transistors, thyristors, diodes, and other electrical components.

The device employes circuit means adapted for operative association with a component to be tested which may exhibit amplifier characteristics such as, for example, a transistor 38. Leads from the circuit containing alligator clips 40, depicted schematically in the drawing at B, E, and C, are connectable to the base, emitter and collector leads of the transistor 38, respectively, in the usual and well-known manner. A source 42 of d.c. potential, preferably being a conventional 9 volt transistor battery, supplies power to operate the various stages of the tester, including the oscillator stage formed with the transistor 38. A double pole, single-throw switch 44 is provided to turn the tester on and off.

An interstage transformer 46 having a relatively low impedance primary winding 48, preferably of 2-3K ohms, and a relatively high impedance secondary winding 50, preferably of about 10K ohms, is connected between the oscillator stage containing the transistor 38 and a transistor 52 which functions as an amplifier. Collector-to-base d.c. bias is provided for operation of the transistor 38 by a variable resistor 54, preferably being adjustable between about 100 ohms and 25K ohms.

A double pole-double throw self test switch 56 is shown in the normal transistor 38 test position, which when thrown to the opposite position will substitute a self-test transistor 58 into the oscillator stage circuitry in place of the transistor 38 and remove the latter thererfrom. Both of the transistors 52 and 58 may be of the 2N5172 or other suitable and well-known type. A double pole-double throw polarity reversing switch 60, shown in the drawing in position for testing the transistor 38 when of the NPN type, can be thrown to the opposite position to reverse the polarity of the source 42 as applied to the transistor 38, whenever the latter is of the PNP type.

A d.c. blocking capacitor 62, preferably 0.01 mfd. in value, inhibits d.c. current flow to or from the base of the transistor 38 during testing by way of the a.c. signal feedback path. A lamp 64, preferably of 4 volt, 40 ma. rating, connected between the emitter of the transistor 38 and the source 42 through the on/off switch 44 and the polarity reversing switch 60, provides means for detecting current flow through the collector-emitter junction of the transistor 38 to indicate open or short circuit conditions and continuity thereof. A lamp 66, preferably of rating similar to the lamp 64, is connected between the collector of the transistor 52 and, through the source 42 and switch 44, to the emitter thereof to detect an amplified signal resulting from any oscillation occurring in the oscillator stage with which the transistor 38 is associated.

A blocking capacitor 68, preferably 0.01 mfd. in value, is connected between the base of the transistor 52 and the winding 50 as shown, to inhibit any tendency of the tester to produce low frequency self oscillation which can result from transient conditions which may occur when the transistor test leads are shorted together. In the absence of the capacitor 68, such spurious oscillation can occur where both the transistor 38 under test and the transistor 52 are powered by a common source of d.c. potential as at 42 whose internal impedance is significant relative to the load impedance thereon. Such a condition does not occur in the device shown in FIG. 1 where the transistor 12 under test and the transistor 30 are powered by two separate and independent sources 18 and 34 respectively, whereby no such blocking capacitance is required. Neither will such self oscillation occur in the circuit of the instant example where the internal impedance of the source 42 is insignificant in comparison to any load impedance which may be placed upon the source 42, in which event the capacitor 68 can be omitted from the circuit.

In an actual model of this tester, I have found that a wide variety of junction field effect type transistors can be successfully tested thereby, unlike other oscillator type testers of the prior art, as well as a wide variety of bipolar type transistors. Also, it is readily possible to test the d.c. continuity of diodes, resistors, inductors, capacitors and the various pair-junctions of semiconductor devices merely by connecting the same between the leads 40 of the tester designated for connection to the collector C and emitter E of the transistor 38, by applying the source 42 thereto by means of the switch 44 and by observing the lamp 64 for an indication of current flow through the component being tested.

When testing operability of junctions or other devices which may exhibit rectifier characteristics, such characteristics can readily be observed by connecting the device in the manner specified for continuity testing as above explained and by reversing the polarity of the source 42 with the switch 60. If the lamp 64 glows with the switch 60 in one position and does not glow when the switch 60 is placed in the opposite position, the rectification capability of the junction or device being tested is verified. If the lamp 64 does not glow in either position of the switch 60, an absolute open-circuit condition of the junction or device is indicated. Conversely, if the lamp 64 glows with the switch 60 in either position, the device being tested is short circuited. In both of the latter cases, the user of the device not only is appraised of a defective device incapable of rectification, but discovers whether the fault is due to an open or short-circuit condition which, in turn, aids him in determining the original cause of the fault.

I have found that the tester of this example can also be used to test the rectifier characteristics of the group of semiconductors known as switching thyristors such as, for example, the familiar and well-known SCR. The rectifier properties of the SCR can be altered by operation of its gate electrode to switch the device from a low conduction state to a high conduction state. My tester can be used to check the conduction of the SCR both before and after such switching by connecting the anode and cathode of the SCR to the leads 40 of the tester designated for connection to the emitter E and collector C of the transistor 38. Initially, the gate electrode of the SCR is allowed to float unconnected to the tester. The switch 60 is then switched to both the NPN and PNP positions to reverse the polarity of the source 42 as applied to the SCR. In both switch positions, the lamp 64 should remain off, indicative of the low conduction state of the SCR.

Next, the gate electrode of the SCR is momentarily shorted to the anode to switch the SCR into the conduction state. If the SCR is operating properly, the lamp 64 will glow indicating that the gate has in fact switched the SCR to the conduction state.

It should be noted that the tester cannot be used to test the dynamic operating condition of a transistor while the same is connected in a circuit which contains an impedance which will effectively short out or ground the a.c. input or output signal thereof as generated in association with the oscillator stage of the tester. The tester of the present example generates a fundamental a.c. signal or oscillation in approximately the 100 to 250 kHz radio frequency range. Such a relatively high frequency signal could be shorted out when testing transistors connected in low frequency amplifier stages in some cases. In such cases, the transistor under test must be disconnected from its normally associated circuitry prior to testing.

The oscillator circuitry associated with the transistor 38 to be tested, operates the transistor 38 under test well below its maximum heat dissipation rating in most cases. The amplifier stage associated with the transistor 52 provides sufficient amplification of any oscillation sustained in the oscillator stage of the tester, to adequately light the lamp 66 when the transistor 38 is operating dynamically. Other types of indicating means such as, for example, a suitable milliammeter can be substituted for the lamp 66. A suitable speaker can also be substituted therefor in any well-known manner provided that the oscillator stage is suitably redesigned to produce feedback induced oscillations in the audio frequency range. This would require selection of the coil 48 having a lower natural resonant frequency falling within the audio range, preferably below 15 kHz.

Although the instant invention has been described with respect to specific details of certain embodiments thereof it is not intended that such details limit the scope of the instant invention except insofar as is set forth in the following claims.

I claim:

1. A device for testing a semiconductor of the type which may exhibit amplifier characteristics comprising circuit means adapted for operative association with said semiconductor to produce feedback induced oscillations,
amplifying means coupled to said circuit means and responsive to said oscillations,
detecting means responsively connected to said amplifying means for indicating the presence of said oscillations in said circuit means,
a second semiconductor capable of exhibiting amplifier characteristics, and
switching means for selectively applying said second semiconductor to said circuit means in place of said semiconductor to be tested, to test whether said device is operative.

2. The device of claim 1 further comprising second switching means for selectively reversing the polarity of a d.c. potential applicable to said circuit means.

3. The device of claim 1 further comprising a source of d.c. potential applicable to said circuit and amplifying means.

4. The device of claim 1 further comprising means for inductively coupling said oscillation to said amplifying means.

5. The device of claim 1 further comprising second detecting means responsively connected to said circuit means for indicating the presence of current flowing through said semiconductor, whereby the continuity of electrical components may be tested.

6. The device of claim 1 wherein said circuit means forms an oscillator stage of the Hartley type when operatively associated with said semiconductor.

7. The device of claim 1 wherein said detecting means comprises a lamp.

8. The device of claim 1 further comprising a second lamp responsively connected to said circuit means for indicating the presence of current flow through said semiconductor, whereby the continuity of electrical components may be tested.

9. The device of claim 1 wherein said circuit means is adapted to produce said oscillations at radio frequencies.

10. The device of claim 1 further comprising means for selectively applying a source of d.c. potential to said circuit and amplifying means.

11. A device for testing the amplification properties of a transistor and other semiconductors and for testing the d.c. electrical continuity and rectifier characteristics of electrical components comprising circuit means adapted for operative association with said transistor to produce feedback induced radio frequency oscillations, an amplifier stage responsively coupled to said circuit means, an interstage transformer having a primary winding connectable in receiving relationship to the collector and emitter electrodes of said transistor and a secondary winding operatively connected to said amplifier stage, a self-test transistor, first switching means for selectively applying said self-test transistor to said circuit means in place of said transistor, a source of d.c. potential to power said transistor, self-test transistor and amplifier stage, an on/off switch for selectively applying said source to said circuit means, and amplifier stage, a first lamp connected in receiving relation to said amplifier stage to detect oscillations in said circuit means, a second lamp connected to said circuit means in receiving relationship to said emitter electrode for indicating current flow therethrough, means for reversing the polarity of said source applicable to said transistor, a variable resistance connectable between the collector and base electrode of said transistor for providing d.c. bias thereto, a d.c. blocking capacitor connectable between said base electrode and said primary winding for inhibiting the flow of d.c. current to and from said base electrode through the a.c. signal feedback path of said circuit means, and an a.c. blocking capacitor connected between said secondary winding and amplifier stage to inhibit relatively low frequency self oscillation between said circuit means and amplifier stage and to pass said feedback induced oscillations from said circuit means to said amplifier stage.

* * * * *